Oct. 6, 1925.

T. OLINGER 1,555,872

PULLEY CONSTRUCTION

Filed May 11, 1925

Inventor
Thomas Olinger
By Frank E. Liveronie, Jr.
Attorney

Patented Oct. 6, 1925.

1,555,872

UNITED STATES PATENT OFFICE.

THOMAS OLINGER, OF HOLLAND, MICHIGAN, ASSIGNOR TO FEDERAL MANUFACTURING COMPANY, OF HOLLAND, MICHIGAN, A CORPORATION OF MICHIGAN.

PULLEY CONSTRUCTION.

Application filed May 11, 1925. Serial No. 29,277.

*To all whom it may concern:*

Be it known that I, THOMAS OLINGER, a citizen of the United States of America, residing at Holland, in the county of Ottawa and State of Michigan, have invented certain new and useful Improvements in Pulley Constructions; and I do hereby declare the following to be a full, clear, and exact description of the invention, such as will enable others skilled in the art to which it appertains to make and use the same.

This invention relates to a pulley construction and is particularly concerned with a simple and novel means for connecting a screw supporting and attaching device with the pulley housing whereby the pulley may be conveniently mounted on any suitable support into which the screw may be inserted. The invention is designed for the production of a combined pulley and screw connection which can be made very economically and produced in large quantities at low cost.

For an understanding of the invention by means of which these ends are effectively attained, as well as many others not at this time enumerated but which will later appear, reference may be had to the following description taken in connection with the accompanying drawing, in which—

Like reference characters refer to like parts in the different figures of the drawing.

Figure 2:
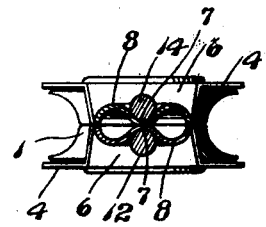
Fig. 2 is a horizontal section on the plane of line 2—2 of Fig. 1.
Figure 1:
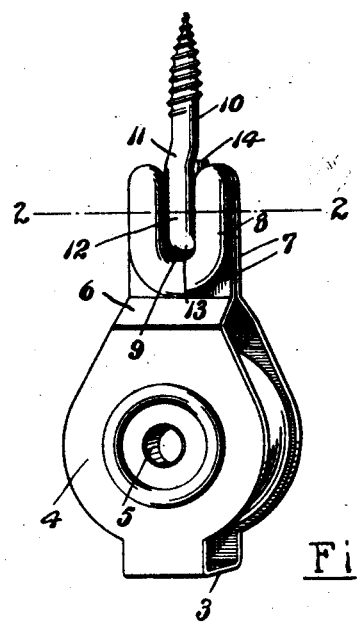
Fig. 1 is a perspective view of the pulley construction made in accordance with my invention.
Figure 3:
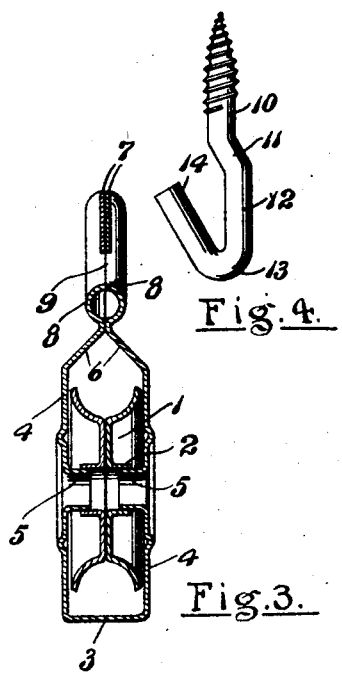
Fig. 3 is a vertical section through the pulley and its housing, the screw attachment being disconnected.
Figure 4:
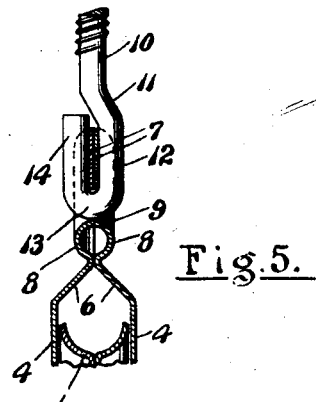
Fig. 4 is an elevation of the screw attachment used in connection with the pulley before its attachment thereto.

The pulley 1 is formed of sheet metal preferably and is provided with outwardly extending hub portions 2. This pulley is located within a housing preferably made from a single piece of sheet metal which is bent substantially into U-shape having a connecting bottom cross member 3 from which the sides 4 extend upwardly in spaced apart parallel relation, each having an inwardly projecting bearing 5 over which the ends of the hubs 2 of the pulley extend. The upper portions of the sides 1 are turned inwardly and upwardly toward each other making the inclined upper sections 6, each of which is then extended upwardly and formed into embossed ears 7, the embossings, indicated at 8, being substantially U-shaped in form as shown. The ears 7 lie flat against each other except at such embossed portions and are provided with joining openings 9 directly above the bends of the U-shaped embossings.

Figure 5:
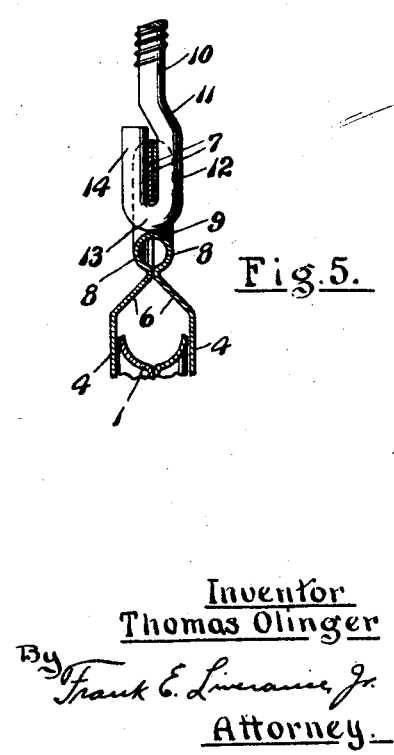
Fig. 5 is a fragmentary vertical section through the upper portion of the pulley with the screw attachment connected.

The screw attachment designed to be used in connection with this pulley and its housing comprises a shank 10, screw threaded at one end and which, at its lower end, is bent outwardly and downwardly at an angle making a short inclined section 11, from which a vertical section 12 extends downwardly and is then bent back upon itself, making the bend 13, and the upwardly extending inclined terminal section 14. The hook thus made is readily connected to the pulley housing by passing the terminal section 14 through the openings 9 in the ears 7 of the housing. Then by closing the hook or bringing the terminal section 14 substantially into vertical position and parallel to the section 12 a secure and permanent section is made of the screw attachment to the pulley housing, as best shown in Fig. 5.

By reason of the fact that the sections 12 and 14 of the screw attachment are located between the vertical legs of said U-shaped embossings 8 it is evident that the screw attachment can have no movement with respect to the pulley housing, that is, a substantially permanent and rigid connection of the two parts is made. The projecting threaded end of the shank 10 may be inserted into any wood support or support of other material into which screws may be driven, thus supporting the housing and its pulley in a desired position and at any desired angle dependent upon the direction that the screw attachment is driven.

The construction is very simple and is particularly economical to produce. The invention is defined in the appended claims and is to be considered as comprehensive of all forms of structure coming within their scope.

I claim:

1. In a device of the class described, a housing comprising spaced apart sides having their upper ends bent inwardly toward each other and terminating in upwardly extending contacting ears, each of said ears being formed with an opening therethrough, and an embossing extending outwardly adjacent said opening, said embossing at the upper end of each ear having spaced apart outwardly extending portions, and a hook adapted to pass through the openings in said ears having opposite sides seated between said outwardly projecting portions whereby a permanent connection is made between the hook and the ears and the hook is held against movement with respect to said ears.

2. In a device of the class described, a housing having spaced apart sides the upper portions of which are bent inwardly toward each other and terminate in upwardly extending contacting ears, each of said ears having an opening therethrough and each of said ears being formed with an outwardly pressed embossing adjacent said openings, said embossing being continuous except at the upper end of said ears, the ends of the embossings terminating a short distance from each other whereby a vertical groove is formed between the ends of each embossing, and a hook member formed from wire rod inserted through said openings and clenched against the ears in said grooves thereby making a permanent connection between the housing and hook member.

3. A device of the class described comprising a pulley housing having upwardly extending ears lying in contact with each other, each of said ears having a circular opening therethrough, and a hook member extending through said opening and having its parts located in parallel relation one against the outer side of each of said ears, each of said ears being formed with outwardly extending embossings one at each side of said parts of the hook member.

4. In a device of the class described, two sheet metal members located alongside of and in contact with each other having aligned openings therethrough, and a hook shaped attaching device passing through said openings and having parallel sections lying one against the outer side of each of said sheet metal members, each of said members at each side of said hook sections being formed with outwardly extending portions between which said sections of the hook device lie, substantially as described.

5. In a device of the class described, two sheet metal members located alongside of and in contact with each other having aligned openings therethrough, each of said members being formed with an outwardly pressed U-shaped embossing having spaced apart vertical portions extending upwardly at each side of and above the opening in the member and the bend of said embossing passing below said opening, and a hook shaped attaching device passing through said openings in the members and having parallel sections lying one against the outer side of each of said sheet metal members and between the vertical portions of said embossings, substantially as described.

In testimony whereof I affix my signature.

THOMAS OLINGER.